United States Patent [19]

Segal

[11] Patent Number: 4,580,842
[45] Date of Patent: Apr. 8, 1986

[54] RESTRAINING MEANS FOR A CHILD CAR SEAT

[76] Inventor: Joseph Segal, 17 Woodleigh Rd., Framingham, Mass. 01701

[21] Appl. No.: 524,784

[22] Filed: Aug. 19, 1983

[51] Int. Cl.[4] ............................................. A47C 31/00
[52] U.S. Cl. .................................. 297/488; 297/216; 297/250
[58] Field of Search .............. 297/250, 254, 255, 216, 297/464, 487, 467, 488, 155; 280/748

[56] References Cited

U.S. PATENT DOCUMENTS

| | | | |
|---|---|---|---|
| 597,991 | 1/1898 | Lease | 297/487 |
| 2,690,787 | 10/1954 | Soltis | 297/255 |
| 3,899,042 | 8/1975 | Bonar | 297/487 |
| 4,376,551 | 3/1983 | Cone | 297/250 |
| 4,402,548 | 9/1983 | Mason | 297/250 |
| 4,429,916 | 2/1984 | Hyde et al. | 297/250 |
| 4,436,341 | 3/1984 | Converse | 297/250 |

FOREIGN PATENT DOCUMENTS

| | | | |
|---|---|---|---|
| 12376 | of 1908 | United Kingdom | 297/155 |
| 1442398 | 7/1976 | United Kingdom | 297/250 |
| 1554334 | 10/1979 | United Kingdom | 297/250 |

Primary Examiner—James T. McCall

[57] ABSTRACT

An improved, easy-to-use restraining means of a child to a car seat is provided which includes a plurality of straps, comprising of a pair of shoulder straps, a pair of lap straps, and a crotch strap, and a padded U-shaped cross-bar pivotally mounted to the side frame of the seat so as to be movable between positions aside and in front of occupant. The said plurality of straps is provided with adjusting buckles for adjusting the length of straps, and with buckles and plates that may mate together so as to arrest occupant in the seat securely and comfortably. The said straps pass through a plurality of slots in the said child car seat to the rear of seat and are assembled there together by means of interlacing and stitching so as to form a unitary structure. The said U-shaped cross-bar is provided with a pair of extending rods pivotally mounted to the respective side-frame of the chair so as to bias the said cross-bar in a vertical position aside of occupant. The said cross-bar is also provided with a loop-strap positioned at its middle-lower part through which the said crotch strap may pass so as to anchor the cross-bar onto its lower position in front of occupant.

1 Claim, 4 Drawing Figures

1

RESTRAINING MEANS FOR A CHILD CAR SEAT

BACKGROUND OF THE INVENTION

This invention is related to a restraining means of a child to a car seat. Several types of devices, in the form of a plurality of straps or harness, are currently used to secure a child in a car seat. In some instances the child is secured to the seat by crossed shoulder straps hooked to the vehicle lap-securing belt passing through child car seat slots and infront and across occupant, as described in U.S. Pat. No. 4,047,755. In others, a harness rectangularly shaped comprising of a plurality of straps surrounds the occupant and is attached to shoulder straps from one end and to lap straps from the other end as described in U.S. Pat. No. 4,164,357. While still in other, a plurality of straps comprising of a pair of continuous shoulder-lap straps and a crotch strap, in which the shoulder-lap and crotch straps are mated together by means of plates and buckles so as to arrest occupant as described in U.S. Pat. No. 3,791,694. Also, other offer a restraining device comprising of a plurality of straps and a U-shaped cross-bar positioned in front of occupant, as in U.S. Pat. Nos. 4,186,962 and 4,376,551.

However, while the above and other inventions provide restraining means securing child to the seat, they all, although sometimes so claimed, are not easily operated, and in many occasions the introduction and removal of child into and out from the seat is an excruciating task involving excessive and unnecessary effort, strain and frustration on part of both adult and child.

SUMMARY OF THE INVENTION

Therefore, it is the primary object of this invention to provide an improved restraining means of a child to a car seat that is easy to use and at the same time secures child to seat comfortably and safely. The other advantage of this invention is that the restraining means described herein can be assembled onto conventional, currently manufactutred child car seats with minor or no change in the latters construction.

Briefly, the improved child restraining system is comprised of two separate units which are secured to one another so as to arrest child safely and comfortably in the seat. The first unit is a plurality of straps comprising of a pair of shoulder straps, a pair of lap straps, and a crotch strap, adjustable to the size of occupant child. The proximal ends of said straps are mating by means of plates and and buckles so as to surround child in the seat. The said straps pass through a plurality of slots in the seat and are secured together at the back of seat by means of interlacing and stitching. The second unit is a paded U-shaped cross-bar provided with a pair of extending rods pivotally mounted onto the side frame of the seat so as to be movable between positions aside and in front of occupant. The said cross-bar, which is provided with a loop-strap, is held at its low position, in front of occupant, by the said crotch-strap which passes through the said loop-strap and mating with the said shoulder and lap straps.

DETAILED DESCRIPTION OF THE REFFERED EMBODIMENT

Figure 1:
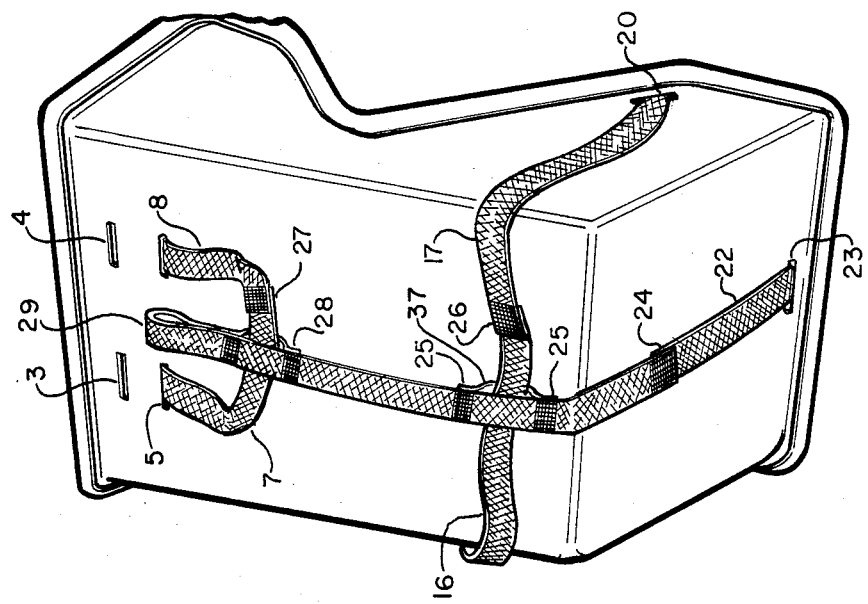
FIG. 1 is a perspective view of the child car seat with the plurality of straps of the restraining means of the invention.
Figure 3:
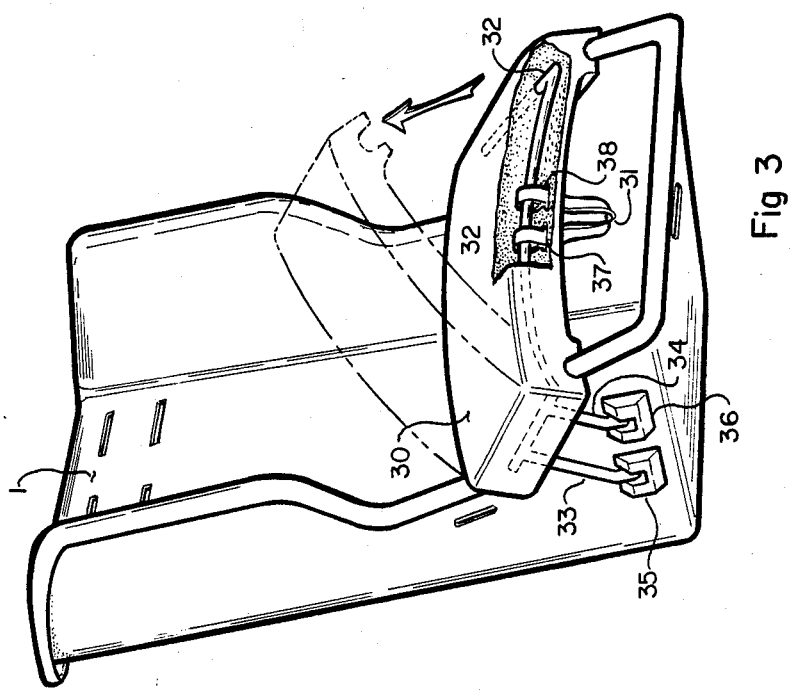
FIG. 3 is a prespective view of the car seat with the U-shaped cross-bar.
Figure 4:
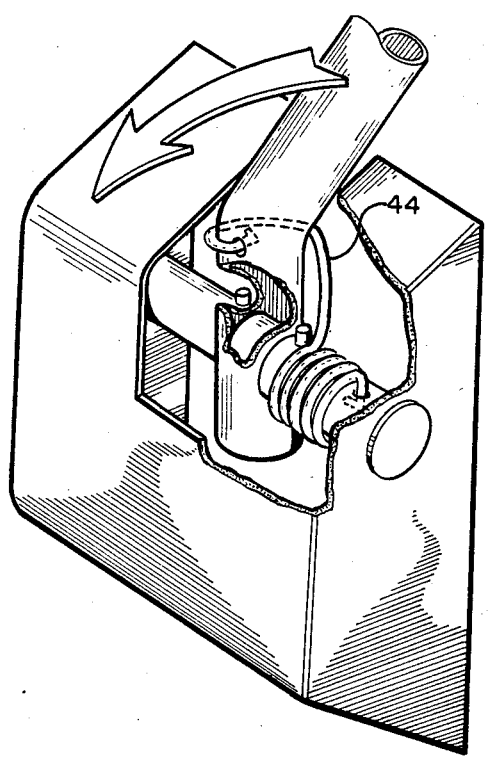
FIG. 4 is a perspective view of the box-shaped unit with parts broken away to illustrate the coiled spring.

Referring now to the drawings, and more particularly to FIG. 1 and FIG. 3, the restraining means of a child to a child car seat is shown. The proposed restraining means includes a plurality of straps, shown in FIG. 1, and a U-shaped cross-bar, shown in FIG. 3. The plurality of straps comprising of a pair of shoulder straps 7 and 8, a pair of lap straps 16 and 17, and a crotch strap 22. The shoulder straps 7 and 8 are provided with plates 10 and 11 to which snap-releasable buckles 12 and 13 of lap straps 16 and 17 are respectably mated, so as to wrap about and secure the occupant in the car seat. Plate 10 and buckle 12 are mounted and fixed to the ends of straps 7 and 16, respectively. Plate 11 and buckle 13 may freely slide along straps 8 and 17, respectively, so as to allow them to be positioned against each other following the adjustment of length of shoulder and lap straps. The shoulder strap 8 and the lap strap 17 each having an adjustable buckle 9 and 18 for adjusting the length of shoulder and lap straps to fit about the occupant. Straps 16 and 17 are mounted with the respective hook-shaped plates 14 and 15 which may freely slide along the respective lap strap. The proximal end of crotch strap 22 is terminated with a snap-releasable buckle 21 to which plates 14 and 15 may mate. The two buckle-plate assemblies comprising of the elements 10,11,12,13 and 14,15,21 are entirely conventional and well known to those having skill in the art. The crotch strap 22 may first pass through the loop-strap 31, of the U-shaped cross-bar 30 positioned in front of occupant, and then mate with plates 14 and 15 of lap straps 16 and 17, so as to secure cross-bar 30 onto its lower position in front of occupant.

The body of the car seat is provided with a plurality of slots through which the various straps may pass from the front to back of the seat. The plurality of slots comprising of two pairs of slots 3 and 4, and 5 and 6 near the upper end of the rear wall 1 through which the distal, free end of the respective shoulder straps 7 and 8 may pass. The seat is also provided with a pair of slots 19 and 20 at the respective side of the chair, through which the respective lap straps 16 and 17 may pass, and with one slot 23 at the proximal end of part 2 through which the crotch strap 22 may pass.

Figure 2:
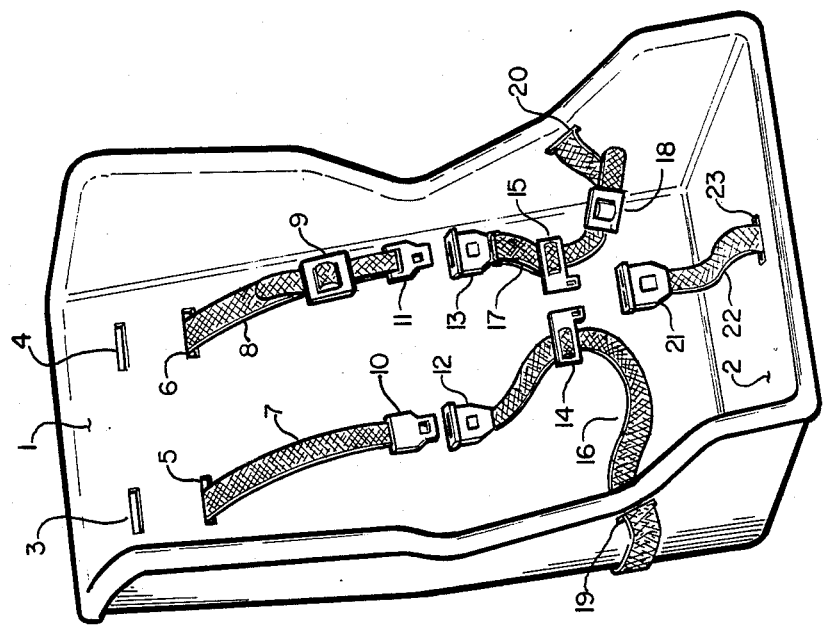
FIG. 2 is a rear view of the car seat and the assembled plurality of straps thereabout.

FIG. 2 is a rear view of the car seat showing the engagement of the various straps thereabout by means of interlacing and stitching 24,26,27,28,29,37 so as to allow the engagement and disengagement of the plurality of straps only by the means of the buckles and plates described above. It should be understood that stitches 24,26, and 27 are optional and can be omitted, in part or alltogether, when the respective pair of shoulder straps 7 and 8, the pair of lap straps 16 and 17, or the crotch strap 22 are each comprised of a single unit. The rear or distal part of crotch strap 22 is provided with a middle loop 37 through which the stitch-combined lap straps 16 and 17 may pass, and with two end loops 28 and 29 through which the rear, stitch-combined shoulder straps 7 and 8 may pass.

The U-shaped cross-bar 30, shown in FIG. 3, is comprised of a metal frame 32 mounted with a well padded plastic tray of sufficient size so as to prevent child from being thrown forward and to provide comfortable and secure support to child's head and body when contacting it upon a sudden forward movement. A pair of rods 33 and 34 extanding from the ends of the right side-arm of cross-bar 30 are pivotally mounted to the right side-frame of the car seat. The extending bars 33 and 34 are mounted to the car seat by means of the respective box-shaped units 35 and 36, which are fixed onto the seat frame. The narrow openings along the mid-upper and mid-side faces of units 35 and 36 allow bars 33 and 34 to move freely, at 90° span, when cross-bar 30 is positioned between its verticle and horizontal positions. These openings in units 35 and 36 may be loosely covered with a well known means so as to prevent the introduction of dust and particles into units 35 and 36, but, at the same time, allowing free movement of bars 33 and 34. Units 35 and 36 are each provided with a coiled spring 44 mounted onto the respective extending bars 33 and 34 so as to bias cross-bar 30 to the verticle (open) position, indicated by arrow in FIG. 3. It should be understood that U-shaped cross-bar 30 may be provided, if so desired, with a pair of extending bars positioned on its left side, rather than the right side, so as to be movable from left to right to be positioned in front of occupant. The cross-bar 30 is also provided with a loop-strap 31 through which the proximal end of crotch strap 22 may pass so as to secure crss-bar 30 onto its lower position in front of occupant. The cross-bar 30 comprising of the elements 31,32,33,34,35,36 is well known to those having skill in the art.

It should also be understood that the cross-bar 30 can be replaced, if so desired, by a U-shaped cross-bar pivotally mounted at its distal ends to the opposite sides of the upper end of part 1 of the car seat, so as to be movable between positions above and in front of the occupant as described in U.S. Pat. No. 4,376,551.

The securing of an individual child to the car seat by the suggested restraining means is as follow: following the introduction of the child into the seat, the shoulder straps 7 and 8 and the lap straps 16 and 17 are positioned about the child, the length of straps is adjusted using the adjusting buckles 9 and 18, and the said straps are then mated respectively by means of the respective plates 10 and 11 and buckles 12 and 13. Thereafter, cross-bar 30 is lowered in front of occupant, crotch strap 22 is then passed through loop-strap 31 and is mated with the assembled shoulder-lap straps by means of plates 14 and 15 and buckle 21. The removal of child from the seat follows the same steps but in the reverse order.

The main assets and advantages of the restraining means of a child to a car seat described herein are that it is very easy to use, avoiding unnecessary and undesirable effort and strain on part of both adult and child upon introducing and removing child to and from the seat, and that it secures the child to the seat safely and comfortably. Furthermore, the restraining means is adjustable and designed for use for a child from infancy to 50 pounds.

What is claimed is:

1. An improved, easy-to-use restraining means for a child to a child car seat comprising a plurality of straps comprising of three separate units: a pair of shoulder straps, a pair of lap straps, and a crotch strap, each separately adjusted by means of adjusting buckles, mating by means of plates and snap-releasable buckles; a U-shaped cross-bar pivotally mounted at its right, or left side-arm to the respective side frame of said seat by means of a pair of extending rods so as to be movable between the vertical, open position aside of occupant and the horizontal, closed position in front and above occupant; each of the said extending bars is anchored onto a box-shaped unit, fixed onto said seat frame, provided with a coiled spring mounted against the said extending bars so as to bias the said U-shaped cross-bar vertically aside the occupant.

* * * * *